No. 642,751.  
W. F. NIES.  
NECKTIE HOLDER.  
(Application filed July 8, 1899.)  
Patented Feb. 6, 1900.

(No Model.)

Witnesses.  
Thomas J. Drummond  
Gustave F. Magnitzky

Inventor.  
William F. Nies,  
by Crosby Gregory attys.

UNITED STATES PATENT OFFICE.

WILLIAM F. NIES, OF SWAMPSCOTT, MASSACHUSETTS, ASSIGNOR OF ONE HALF TO FRANKLIN F. HODGES, OF BOSTON, MASSACHUSETTS.

NECKTIE-HOLDER.

SPECIFICATION forming part of Letters Patent No. 642,751, dated February 6, 1900.

Application filed July 8, 1899. Serial No. 723,146. (No model.)

*To all whom it may concern:*

Be it known that I, WILLIAM F. NIES, of Swampscott, county of Essex, and State of Massachusetts, have invented an Improvement in Necktie-Holders, of which the following description, in connection with the accompanying drawings, is a specification, like letters and figures on the drawings representing like parts.

This invention relates to necktie-holders; and the object of the invention is to provide a simple and efficient device of this character which is adapted to hold in place at the front of a collar a made-up tie and which is adapted to be detachably connected with a collar-button, the latter serving thereby to secure the holder in place.

The necktie-holder comprises a central portion having a shank lying in a single plane and provided with oppositely-disposed offsets at its lower end, the space within the shank and offsets being open and of approximately T shape, the shank being adapted to grip a collar-button and having at its upper end oppositely-disposed arms terminating in U-shaped members adapted to receive between them the crossed ends of a tie to be made up, and the holder is formed from wire in one continuous piece.

Figure 1:
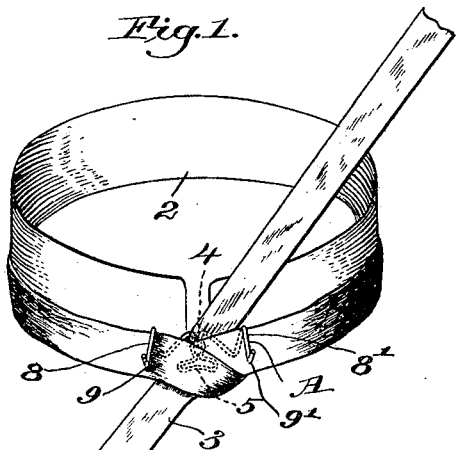
Figure 2:
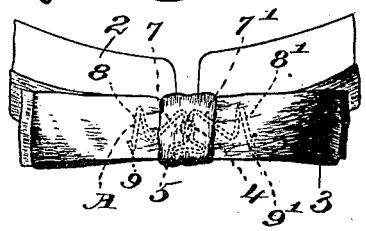
Figure 3:
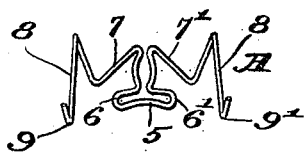
Figure 4:

Figure 1 represents a collar with my improved necktie-holder applied to a collar-button, the necktie being shown in connection with the holder and partially tied. Fig. 2 is a similar view showing the tie made up. Fig. 3 is a front elevation of the holder detached, and Fig. 4 is a plan view of the same.

The collar 2, the tie 3, and the collar-button 4 are and may be all substantially as usual.

My improved necktie-holder is designated in a general way by A, and it is represented as composed, preferably, of wire made in one piece.

The holder A is shaped at its center to present a shank 5, represented as lying in a single plane. This shank is provided at its lower end with oppositely-disposed offsets 6 and 6', and it will be seen upon reference to Fig. 3 that it is open and of approximately T shape. The vertical portion of the shank has its side branches somewhat rounded, and these rounded portions grip the shank of the collar-button.

The shank of the holder is shown open on its upper side to facilitate its application to and removal from the collar-button, and its branches have at the upper ends thereof the oppositely-disposed arms 7 and 7', which terminate in inverted-U-shaped members 8 and 8', having the ends of their longer legs terminating in eyes or loops, as 9 and 9', which construction prevents said ends from penetrating the tie.

In practice the holder is first connected with the shank of a collar-button, after which the tie is passed around the collar and its ends extended forward and placed between the branches of the U-shaped members 8 and 8'. The knot is then made, and it fits between said U-shaped members. As the crossed ends of the tie are between the branches of said U-shaped members, said tie will be always maintained in proper position, and the collar-button will prevent any movement of the holder.

Having described my invention, what I claim as new, and desire to secure by Letters Patent, is—

A necktie-holder comprising a central portion having a shank lying in a single plane and provided with oppositely-disposed offsets at its lower end, the space within the shank and offsets being open and of approximately T shape, the shank being adapted to grip a collar-button, and having at its upper end oppositely-disposed arms terminating in U-shaped members adapted to receive between them the crossed ends of a tie to be made up, and the holder being formed from wire in one continuous piece.

In testimony whereof I have signed my name to this specification in the presence of two subscribing witnesses.

WILLIAM F. NIES.

Witnesses:
 GEO. W. GREGORY,
 JOHN C. EDWARDS.